United States Patent
Abt, Jr. et al.

(10) Patent No.: US 10,382,209 B2
(45) Date of Patent: *Aug. 13, 2019

(54) PRIVACY CONTROL USING UNIQUE IDENTIFIERS ASSOCIATED WITH SENSITIVE DATA ELEMENTS OF A GROUP

(71) Applicant: International Business Machines Corporation, Armonk, NY (US)

(72) Inventors: William F. Abt, Jr., Nashua, NH (US);
Daniel A. Gisolfi, Hopewell, NY (US);
Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/133,958

(22) Filed: Sep. 18, 2018

(65) Prior Publication Data

US 2019/0013952 A1    Jan. 10, 2019

Related U.S. Application Data

(63) Continuation of application No. 16/012,974, filed on Jun. 20, 2018, now Pat. No. 10,164,777, which is a
(Continued)

(51) Int. Cl.
*H04L 9/32* (2006.01)
*H04L 29/06* (2006.01)
(Continued)

(52) U.S. Cl.
CPC .......... *H04L 9/3247* (2013.01); *H04L 9/0643* (2013.01); *H04L 9/0869* (2013.01);
(Continued)

(58) Field of Classification Search
CPC .................................................. H04L 9/3247
(Continued)

(56) References Cited

U.S. PATENT DOCUMENTS 6,487,658 B1    11/2002 Micali
6,622,015 B1    9/2003 Himmel et al.
(Continued)

FOREIGN PATENT DOCUMENTS

WO    2010130230 A1    11/2010
WO    2013072374 A1    5/2013

OTHER PUBLICATIONS

List of IBM Patents or Patent Applications Treated as Related, Sep. 18, 2018, pp. 1-2.
(Continued)

*Primary Examiner* — Jacob Lipman
(74) *Attorney, Agent, or Firm* — Robert A. Voigt, Jr.; Winstead, P.C.

(57) ABSTRACT

A method, system and computer program product for privacy control. A unique identifier for each data element of a group of data elements (e.g., driver's license contains a group of data elements, such as name, driver's license number) is created. These identifiers may be stored along with documentation (e.g., label) of the associated data elements in a manifest file. Alternatively, the identifiers may be stored in a file outside of the manifest file. In this manner, by utilizing a data element identifier which corresponds to a random number, security of privacy information is improved as one would only be able to obtain such sensitive information by obtaining such an identifier. Furthermore, the user only needs to send the requested data elements, as opposed to all the data elements of the group of data elements, to the challenger. In this manner, the user is preserving the security of other privacy information.

20 Claims, 5 Drawing Sheets

Related U.S. Application Data continuation of application No. 14/832,351, filed on Aug. 21, 2015, now Pat. No. 10,097,354.

(51) Int. Cl.

| | | |
|---|---|---|
| *H04W 12/02* | (2009.01) | |
| *H04L 9/06* | (2006.01) | |
| *H04L 9/08* | (2006.01) | |
| *H04L 9/30* | (2006.01) | |
| *H04W 12/06* | (2009.01) | |
| *H04W 12/10* | (2009.01) | |

(52) U.S. Cl.
CPC ............... *H04L 9/30* (2013.01); *H04L 9/321* (2013.01); *H04L 63/0407* (2013.01); *H04W 12/02* (2013.01); *H04L 63/0853* (2013.01); *H04L 63/12* (2013.01); *H04W 12/06* (2013.01); *H04W 12/10* (2013.01)

(58) Field of Classification Search
USPC ......................................................... 713/176
See application file for complete search history.

(56) References Cited

U.S. PATENT DOCUMENTS

| | | |
|---|---|---|
| 7,073,063 B2 | 7/2006 | Peinado |
| 8,215,546 B2 | 7/2012 | Lin et al. |
| 2002/0029337 A1 | 3/2002 | Sudia et al. |
| 2002/0194476 A1 | 12/2002 | Lewis et al. |
| 2007/0157031 A1 | 7/2007 | Sudhakar |
| 2008/0071688 A1 | 3/2008 | Corbett et al. |
| 2008/0133418 A1 | 6/2008 | Lehmann et al. |
| 2009/0106110 A1 | 4/2009 | Stannard et al. |
| 2012/0131058 A1 | 5/2012 | Farber et al. |
| 2013/0159730 A1 | 6/2013 | Asim et al. |
| 2014/0013112 A1 | 1/2014 | Cidon et al. |
| 2014/0013114 A1 | 1/2014 | Redpath |
| 2014/0294175 A1 | 10/2014 | Boloker et al. |
| 2015/0199540 A1 | 7/2015 | Abt, Jr. et al. |
| 2015/0332023 A1 | 11/2015 | Gisolfi et al. |
| 2015/0358166 A1 | 12/2015 | Redpath |

OTHER PUBLICATIONS

Aater Suleman, "Generating Passes for iOS6's Passbook," http://www.futurechips.org/thoughts-on-latest-happenings/generating-passes-ios6s-passbook.html, Jul. 13, 2012, pp. 1-6.

Coogan, G., "May I see your smartphone and registration please?", http://mobilepaymentstoday.com/blogs/8769/May-I-see-your-smart. . . , Aug. 28, 2012 (last accessed Apr. 25, 2014 3:50 PM), pp. 1-3.

IBM, "IBM Mobile Identity," IBM Emerging Technologies—jStart—On the Horizon—Mobile Identity, http:/www-01.ibm.com/software/ebusiness/jstart/mi (last accessed Apr. 9, 2014 11:06 AM), 2013, pp. 1-3.

IBM, "Identity governance," IBM Research—Zurich, Computer Science, Idemix, http:/www.zurich.ibm.com/security/idemix, (last accessed Apr. 9, 2014 11:18 AM), p. 1-2.

IBM, "Mobile Identity: A cryptographic framework for issuing, managing, and challenging digital identification documents," http://www-01.ibm.com/software/ebusiness/jstart/dowloads/mi6x20.pdf, pp. 1-9.

Keolabs, "ISO18013 e-Driving License Conformance Solutions," http://www.keolabs.com/iso18013.html, (accessed May 29, 2014, 1:21 PM), pp. 1-3.

Microsoft, "U-Prove," http:/research.microsoft.com/en-us/projects/u-prove (last accessed Apr. 9, 2014 11:19 AM), pp. 1-2.

New York State, Department of Environmental Conservation, "Lifetime Sporting Licenses," http://www.dec.ny/gov/permits/6099.html, Copyright © 2014 New York State Department of Environmental Conservation (accessed May 29, 2014, 1:19 PM), pp. 1-3.

Toups, D., "License, registration and smartphone," http://www.carinsurance.com/Articles/states-smartphone-proof-of-insura . . . (last updated Mar. 31, 2014; last accessed Apr. 25, 2014 3:52 PM), pp. 1-3.

Wong, A., "Driver's Licenses Contain Too Much Personal Info to Use at a Bar," Future Tense, ASU, The Citizen's Guide to the Future (last modified Apr. 4, 2014 9:46 AM, last accessed Apr. 9, 2014 10:59 AM), pp. 1-2.

PRIVACY CONTROL USING UNIQUE IDENTIFIERS ASSOCIATED WITH SENSITIVE DATA ELEMENTS OF A GROUP

TECHNICAL FIELD

The present invention relates generally to cryptography, and more particularly to privacy control using unique identifiers associated with sensitive data elements of a group.

BACKGROUND

Applications, such as Apple's® "Wallet" (formerly referred to as "Passbook®"), allows users to store coupons, boarding passes, event tickets, store cards, credit cards, loyalty cards as well as debit cards. Such documents and cards may be stored on the user's computing device as an object in a .zip file containing various files, including a "manifest" file.

The manifest file may include a documentation for various data elements, such as a photo of the user, the age of the user, the address of the user and so forth along with a hash code, where a "hash code" refers to the value returned by performing a hash function on the actual/origin data element (e.g., age of 21 years of age). Such data elements may be sensitive data which the user desires to keep private. The manifest file is then digitally signed by a trusted authority to demonstrate the authenticity of the manifest file. Such a signature may be stored in a separate file, commonly referred to as the "signature file."

When a "challenger," such as a government agency, requests one or more data elements (e.g., age of user) from the user, the challenger then attempts to verify the integrity of the received data elements (e.g., age of the user) which may be provided in a manifest file as documentation of the data elements. The challenger may apply a public key of the trusted authority to the manifest file to validate that the manifest file is digitally signed by the trusted authority. The challenger may then read the manifest file to read the documentation of the data element in question (e.g., age of user) and verify the integrity of the data element using its associated hash code in the manifest file to the actual data provided of the data element.

However, the hash code associated with a particular data element (e.g., age of 21 years of age) is the same regardless of whether the documentation for that same data element is in the manifest file of user A or in the manifest file of user B. As a result, it would be possible to reverse engineer to identify the value of the data element (e.g., age of user is 21 years of age) for any user once it became known of the association of the hash code with the value of that data element. That is, by knowing that a particular hash code is associated with a value for a particular data element, then someone may determine if such sensitive data (e.g., age of user is 21 years of age) applies to a user by matching the known hash code for such sensitive information in the user's manifest file documentation of the data elements.

As a result, when a challenger desires to verify the integrity of a particular data element (e.g., age of the user), the challenger may be able to obtain other sensitive information (e.g., address of the user) that is not required to be verified by the challenger since the challenger receives the entire manifest file which contains documentation of all of the data elements.

Hence, there is a security issue in that a user's privacy information may be breached by allowing sensitive information to be exposed, including other sensitive data than what is necessarily to be verified by the challenger.

SUMMARY

In one embodiment of the present invention, a method for privacy control comprises creating an identifier for a user to be added to each data element of a group of data elements. The method further comprises creating a signature for each data element of the group of data elements, where the signature is created by adding the identifier to the data element and hashing the combined data element and identifier using a cryptographic hash function to create a hash code, and where the signature is created by applying a private key to the hash code. The method additionally comprises inserting documentation of the data elements of the group of data elements along with associated identifiers and signatures in a manifest file.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for privacy control. In one embodiment of the present invention, a unique identifier for each data element (e.g., age, photo of user, home address) of a group of data elements (e.g., driver's license contains a group of data elements, such as name, home address, driver's license number, birthdate, eyesight restrictions, height, color of eyes) is created. These identifiers may be stored along with the documentation (e.g., label) of the associated data elements in a manifest file. In the embodiment where identifiers are stored in the manifest file, a signature for each data element in the group of data elements may be created and stored in the manifest file as well. Alternatively, the identifiers may be stored in a file, referred to herein as the "identifier file." In the embodiment where identifiers are stored outside the manifest file, a hash code or signature for each data element in the group of data elements may be created and then stored along with the documentation of the associated data elements in the manifest file. A "challenger" (e.g., government agency) may then request from the user one or more data elements (e.g., photo of the user, age of the user). The user may then send the requested data elements and the manifest file. The challenger will then attempt to verify the integrity of the received data elements, such as by using the identifiers associated with the requested data elements either stored in the manifest file or provided by the user from the identifier file. In this manner, by utilizing a data element identifier which corresponds to a random number, security of privacy information is improved as one would only be able to obtain such sensitive information by obtaining such an identifier. Furthermore, in this manner, the user is preserving the security of other privacy information (e.g., home address) by not providing such information to the challenger.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
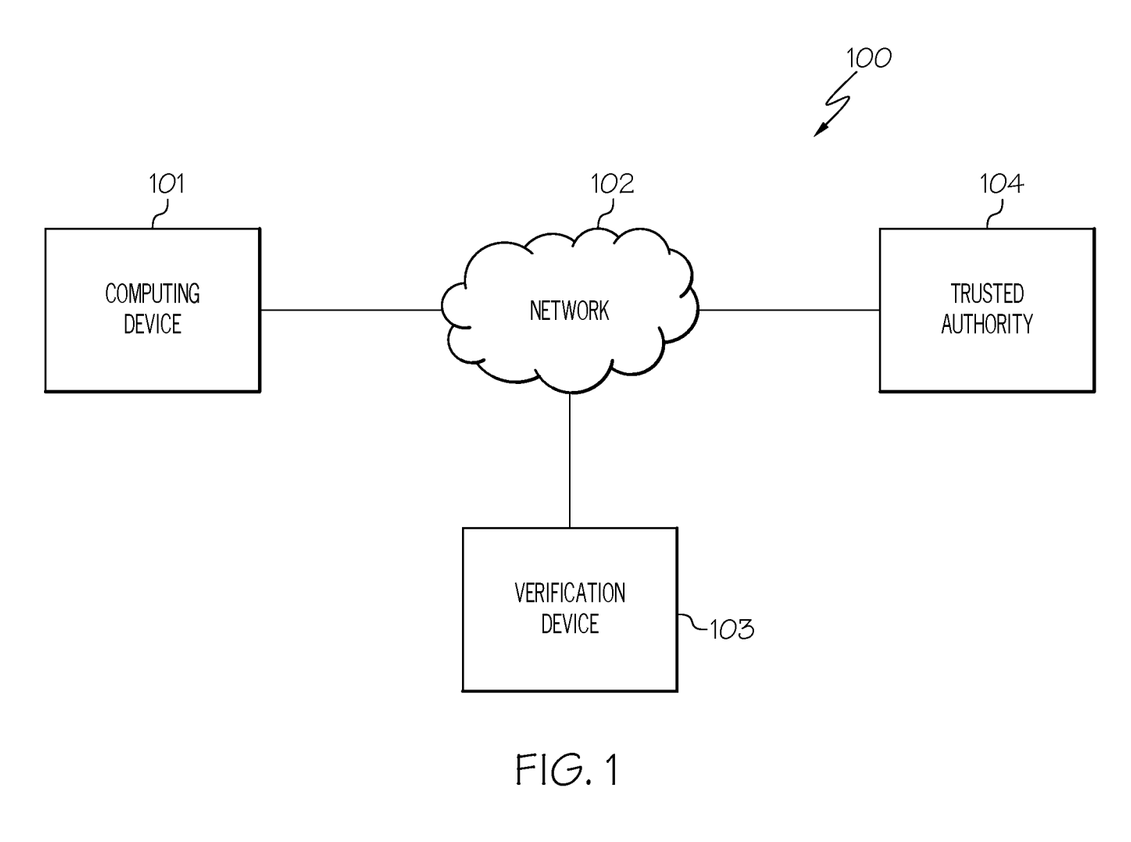
FIG. 1 illustrates a communication system configured in accordance with an embodiment of the present invention.

Referring now to the Figures in detail, FIG. 1 illustrates a communication system 100 for securing sensitive data elements in accordance with an embodiment of the present invention. As illustrated in FIG. 1, system 100 includes a computing device 101 having stored therein sensitive data (e.g., age, address) about the user of computing device 101, such as in a manifest file. Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 102 and consequently communicating with other devices, such as verification device 103 and trusted authority 104.

Network 102 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

As discussed in the Background section, a "challenger," such as a government agency, may attempt to verify the integrity of the data elements (e.g., age of the user) where the documentation of such data elements are stored in the manifest file in computing device 101. The challenger may utilize a computing device, which is referred to herein as the "verification device" 103. Verification device 103 may be any type of computing device configured with the capability of connecting to network 102 and consequently communicating with other devices, such as computing device 101 and trusted authority 104.

Furthermore, trusted authority 104 of system 100 is configured to facilitate interactions between two parties (e.g., computing device 101 and verification device 103) who both trust trusted authority 104. Trusted authority 104 reviews all critical transaction communications between the parties (e.g., computing device 101 and verification device 103), based on the ease of creating fraudulent digital content.

System 100 is not to be limited in scope to any one particular network architecture. System 100 may include any number of computing devices 101, networks 102, verification devices 103 and trusted authorities 104.

A hardware configuration of computing device 101, verification device 103 and trusted authority 104 is now discussed below in connection with FIG. 2.

Figure 2:
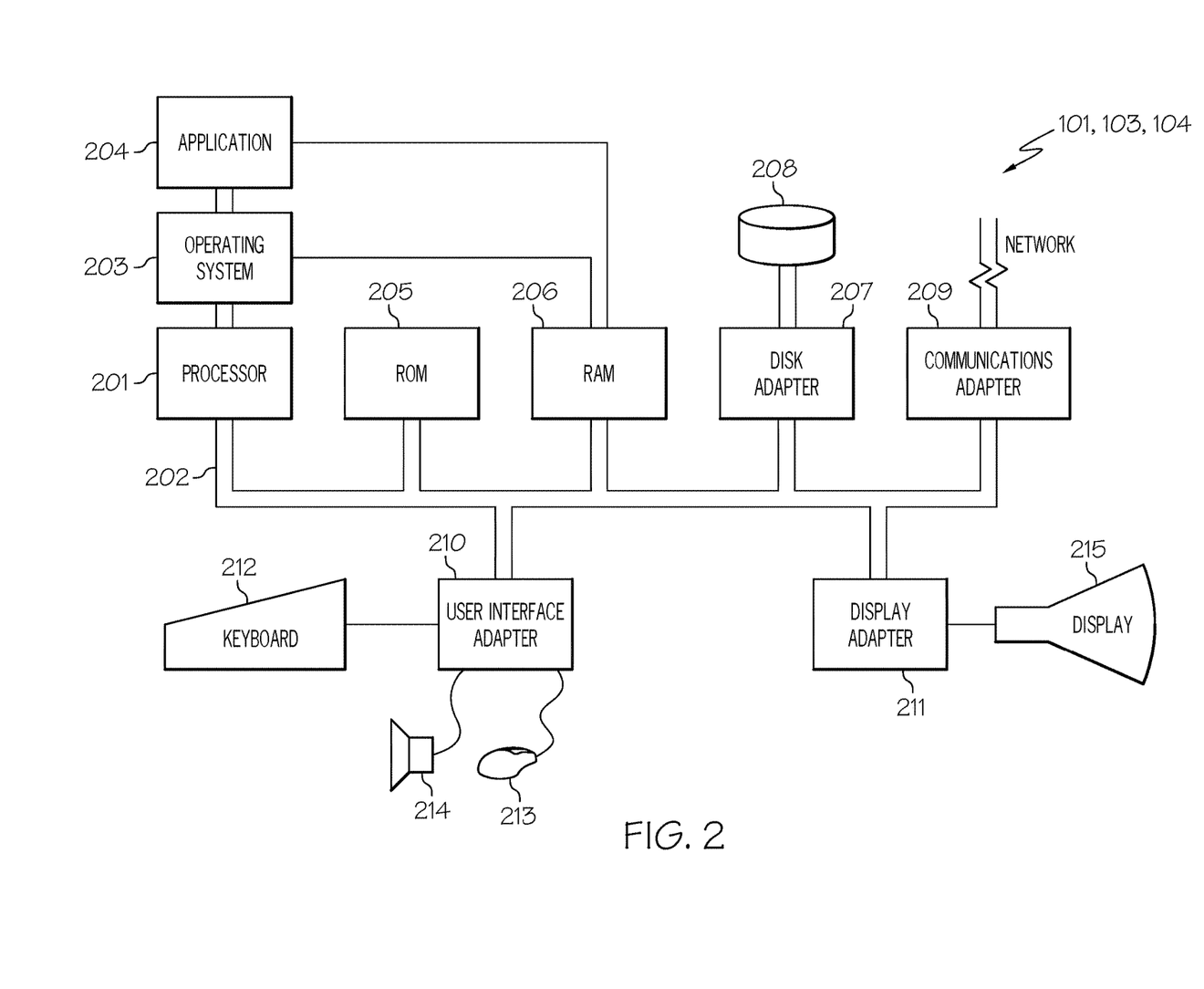
FIG. 2 illustrates a hardware configuration of a computing device, verification device and trusted authority in accordance with an embodiment of the present invention.

FIG. 2 illustrates a hardware configuration of computing device 101 (FIG. 1), verification device 103 (FIG. 1), trusted authority 104 (FIG. 1) which is representative of a hardware environment for practicing the present invention. Referring now to FIG. 2, computing device 101, verification device 103, trusted authority 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 of computing device 101 may include, for example, a program for implementing privacy control by using unique identifiers associated with sensitive data elements of a group as discussed further below in connection with FIGS. 3-6. Application 204 of verification device 103 may include, for example, a program for verifying the integrity of the requested data elements as discussed further below in connection with FIGS. 4 and 6.

Referring again to FIG. 2, read-only memory ("ROM") 205 is coupled to system bus 202 and includes a basic input/output system ("BIOS") that controls certain basic functions of computing device 101, verification device 103, trusted authority 104. Random access memory ("RAM") 206 and disk adapter 207 are also coupled to system bus 202. It should be noted that software components including operating system 203 and application 204 may be loaded into RAM 206, which may be computing device's 101, verification device's 103, trusted authority's 104 main memory for execution. Disk adapter 207 may be an integrated drive electronics ("IDE") adapter that communicates with a disk unit 208, e.g., disk drive.

Computing device 101, verification device 103, trusted authority 104 may further include a communications adapter 209 coupled to bus 202. Communications adapter 209 interconnects bus 202 with an outside network thereby enabling computing device 101, verification device 103, trusted authority 104 to communicate with other devices.

I/O devices may also be connected to computing device 101, verification device 103, trusted authority 104 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 101, verification device 103, trusted authority 104 through keyboard 212 or mouse 213 and receiving output from computing device 101, verification device 103, trusted authority 104 via display 215 or speaker 214. Other input mechanisms may be used to input data to computing device 101, verification device 103, trusted authority 104 that are not shown in FIG. 2, such as display 215 having touch-screen capability and keyboard 212 being a virtual keyboard. Computing device 101, verification device 103, trusted authority 104 of FIG. 2 is not to be limited in scope to the elements depicted in FIG. 2 and may include fewer or additional elements than depicted in FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, applications, such as Apple's® "Wallet" (formerly referred to as "Passbook®"), allows users to store coupons, boarding passes, event tickets, store cards, credit cards, loyalty cards as well as debit cards. Such documents and cards may be stored on the user's computing device as an object in a .zip file containing various files, including a "manifest" file. The manifest file may include a documentation for various data elements, such as a photo of the user, the age of the user, the address of the user and so forth along with a hash code, where a "hash code" refers to the value returned by performing a hash function on the actual/origin data element (e.g., age of 21 years of age). Such data elements may be sensitive data which the user desires to keep private. The manifest file is then digitally signed by a trusted authority to demonstrate the authenticity of the manifest file. Such a signature may be stored in a separate file, commonly referred to as the "signature file." When a "challenger," such as a government agency, requests one or more data elements (e.g., age of user) from the user, the challenger then attempts to verify the integrity of the received data elements (e.g., age of the user) which may be provided in a manifest file as documentation of the data elements. The challenger may apply a public key of the trusted authority to the manifest file to validate that the manifest file is digitally signed by the trusted authority. The challenger may then read the manifest file to read the documentation of the data element in question (e.g., age of user) and verify the integrity of the data element using its associated hash code in the manifest file to the actual data provided of the data element. However, the hash code associated with a particular data element (e.g., age of 21 years of age) is the same regardless of whether the documentation for that same data element is in the manifest file of user A or in the manifest file of user B. As a result, it would be possible to reverse engineer to identify the value of the data element (e.g., age of user is 21 years of age) for any user once it became known of the association of the hash code with the value of that data element. That is, by knowing that a particular hash code is associated with a value for a particular data element, then someone may determine if such sensitive data (e.g., age of user is 21 years of age) applies to a user by matching the known hash code for such sensitive information in the user's manifest file documentation of the data elements. As a result, when a challenger desires to verify the integrity of a particular data element (e.g., age of the user), the challenger may be able to obtain other sensitive information (e.g., address of the user) that is not required to be verified by the challenger since the challenger receives the entire manifest file which contains documentation of all of the data elements. Hence, there is a security issue in that a user's privacy information may be breached by allowing sensitive information to be exposed, including other sensitive data than what is necessarily to be verified by the challenger.

Figure 3:
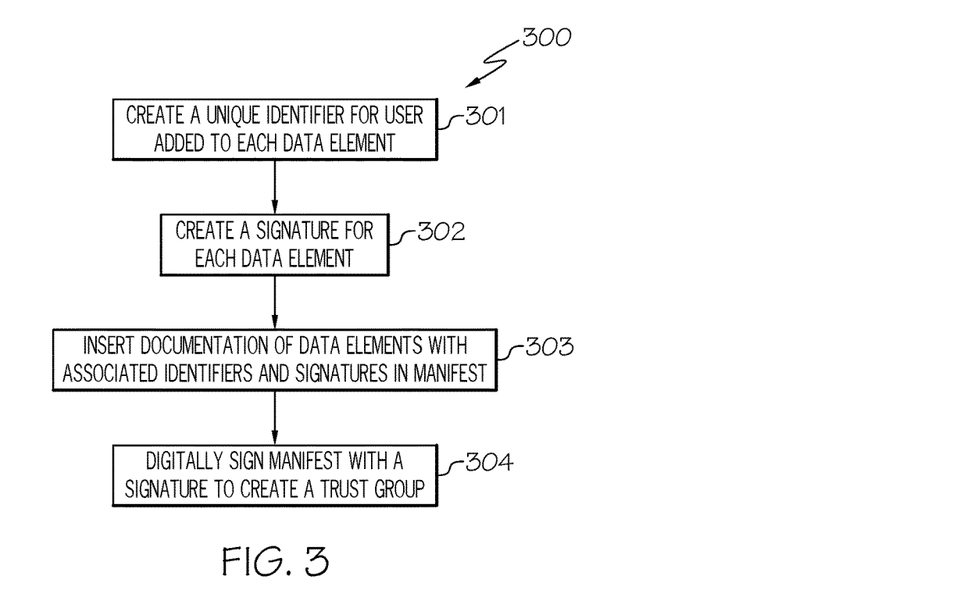
FIG. 3 is a flowchart of a method for securing privacy information by creating identifiers associated with the sensitive data elements which are stored within the manifest file in accordance with an embodiment of the present invention.
Figure 4:
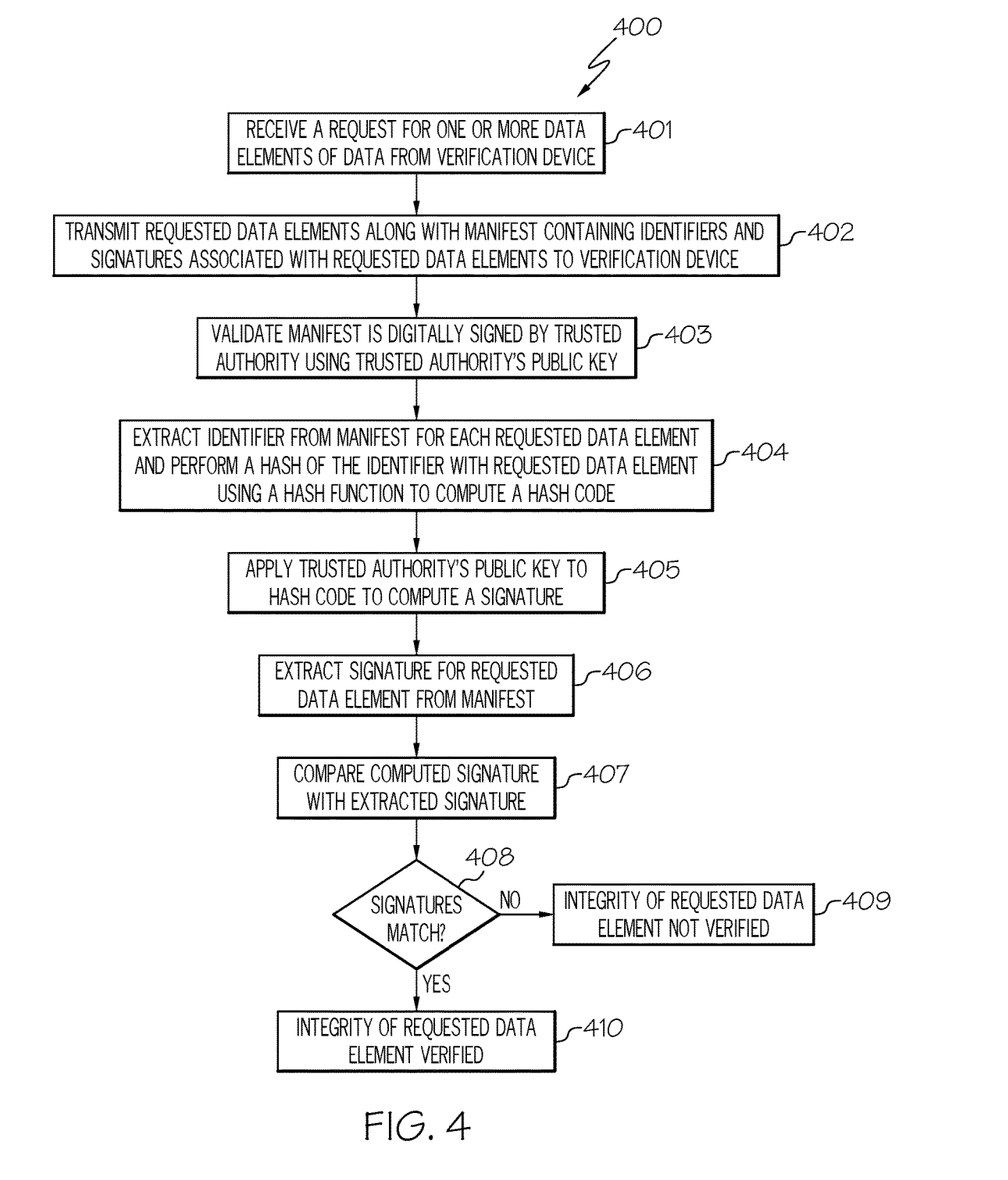
FIG. 4 is a flowchart of a method for a challenger to verify the integrity of the requested data elements with the associated identifiers being located within the manifest file in accordance with an embodiment of the present invention.
Figure 5:
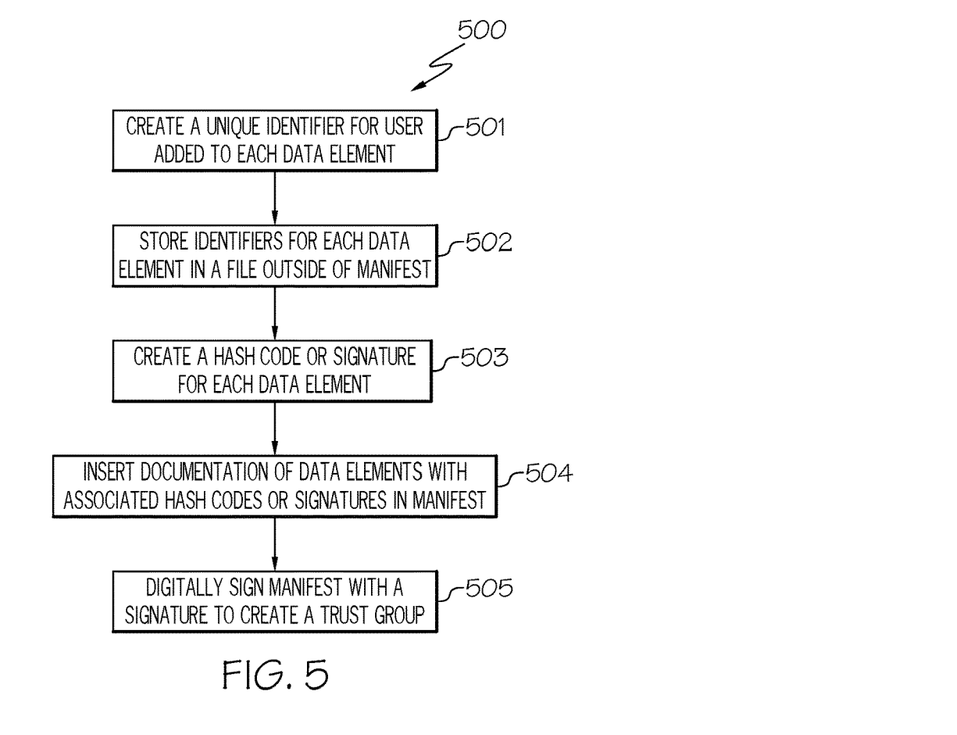
FIG. 5 is a flowchart of an alternative method for securing privacy information by creating identifiers associated with the sensitive data elements which are stored outside the manifest file in a separate file in accordance with an embodiment of the present invention.
Figure 6:
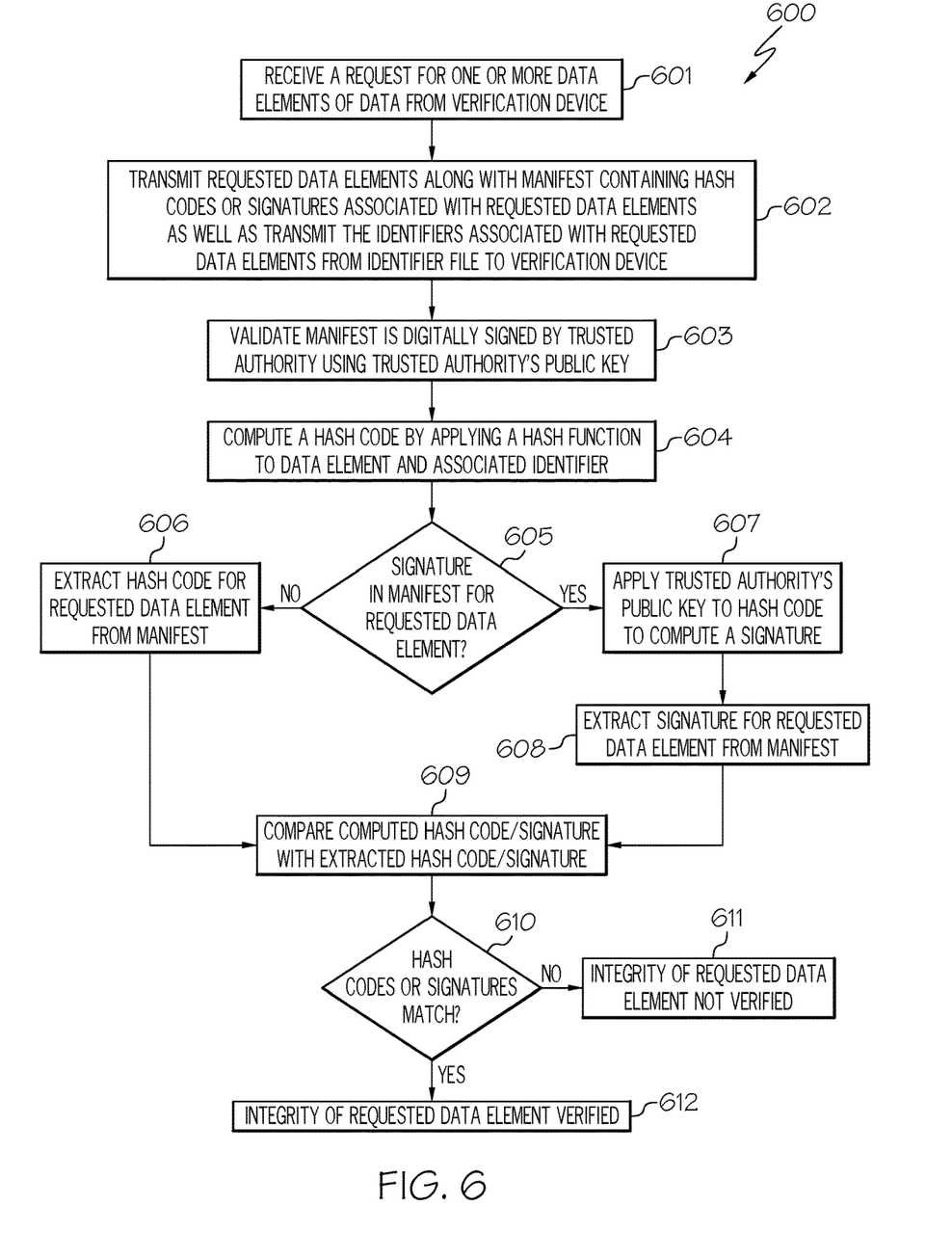
FIG. 6 is a flowchart of a method for a challenger to verify the integrity of the requested data elements with the associated identifiers being located outside the manifest file in accordance with an embodiment of the present invention.

The principles of the present invention provide a means for securing privacy information by using unique identifiers associated with sensitive data elements of a group, where such identifiers may be placed within the manifest file or in a separate file as discussed below in connection with FIGS. 3-6. FIG. 3 is a flowchart of a method for securing privacy information by creating identifiers associated with the sensitive data elements which are stored within the manifest file. FIG. 4 is a flowchart of a method for a challenger to verify the integrity of the requested data elements with the associated identifiers being located within the manifest file. FIG. 5 is a flowchart of an alternative method for securing privacy information by creating identifiers associated with the sensitive data elements which are stored outside the manifest file in a separate file. FIG. 6 is a flowchart of a method for a challenger to verify the integrity of the requested data elements with the associated identifiers being located outside the manifest file.

As stated above, FIG. 3 is a flowchart of a method 300 for securing privacy information by creating identifiers associated with the sensitive data elements which are stored within the manifest file in accordance with an embodiment of the present invention.

Referring to FIG. 3, in conjunction with FIGS. 1-2, in step 301, computing device 101 creates a unique identifier for the user of computing device 101 to be added to each data element (e.g., age, photo of user, home address, social security number) of a group of data elements (e.g., driver's license contains a group of data elements, such as name, home address, driver's license number, birthdate, eyesight restrictions, height, color of eyes). In one embodiment, such an identifier is a random number. In this manner, by utilizing a data element identifier which corresponds to a random number, security of privacy information is improved as one would only be able to obtain such sensitive information by obtaining such an identifier.

In step 302, computing device 101 creates a signature for each data element in the group of data elements. In one embodiment, a signature is created by adding the unique identifier (e.g., random number) to the data element (e.g., age of 21) and hashing the combined data element and identifier using a cryptographic hash function to create a hash code (also referred to as a "hash" or "message digest"). A signature is then created by applying a private key to the hash code. In one embodiment, such a private key is received from trusted authority 104.

In step 303, computing device 101 inserts documentation, such as a label, of the data elements along with the associated identifiers and signatures in a manifest file.

In step 304, trusted authority 104 digitally signs the manifest file with a signature to create a trust group.

As discussed above, a "challenger," (e.g., government agency) may request from the user of computing device 101 one or more data elements (e.g., photo of the user, age of the user). The user of computing device 101 may send the requested data elements and the manifest file to the challenger. The challenger will then attempt to verify the integrity of the received data elements (e.g., age of the user) as discussed below in connection with FIG. 4.

FIG. 4 is a flowchart of a method 400 for a challenger to verify the integrity of the requested data elements in the manifest file with the associated identifiers being located within the manifest file in accordance with an embodiment of the present invention.

Referring to FIG. 4, in conjunction with FIGS. 1-3, in step 401, computing device 101 receives a request for one or more data elements in the group of data elements (e.g., driver's license contains a group of data elements, such as name, home address, driver's license number, birthdate, eyesight restrictions, height, color of eyes) from a verification device 103 (e.g., computing device of the challenger).

In step 402, computing device 101 transmits the requested data elements and the manifest file containing the identifiers and signatures associated with the requested data elements to verification device 103. For example, verification device 103 may request to receive the data elements of the age of the user and a photo of the user. As a result, computing device 101 only transmits those data elements as well as the manifest file that only contains the identifiers and signatures associated with those data elements. In this manner, the user of computing device 101 is preserving the security of other privacy information (e.g., home address) by not providing such information to the verification device 103.

In step 403, verification device 103 validates that the manifest file is digitally signed by trusted authority 104 using the public key from trusted authority 104.

In step 404, verification device 103 extracts the identifier from the manifest file for each requested data element and performs a hash of the identifier with the requested data element using a hash function to compute a hash code.

In step 405, verification device 103 applies the public key of trusted authority 104 to the hash code (hash code computed in step 404) to compute a signature.

In step 406, verification device 103 extracts the signature for the requested data element from the manifest file.

In step 407, verification device 103 compares the computed signature (computed in step 405) with the extracted signature (extracted in step 406).

In step 408, a determination is made by verification device 103 as to whether the computed signature matches the extracted signature.

If the computed signature does not match the extracted signature, then, in step 409, the integrity of the requested data element is not verified by verification device 103.

If, however, the computed signature matches the extracted signature, then, in step 410, the integrity of the requested data element is verified by verification device 103.

An alternative method for securing privacy information is provided below in connection with FIG. 5.

FIG. 5 is a flowchart of an alternative method 500 for securing privacy information by creating identifiers associated with the sensitive data elements which are stored outside the manifest file in a separate file in accordance with an embodiment of the present invention.

Referring to FIG. 5, in conjunction with FIGS. 1-2, in step 501, computing device 101 creates a unique identifier for the user of computing device 101 to be added to each data element (e.g., age, photo of user, home address, social security number) of a group of data elements (e.g., driver's license contains a group of data elements, such as name, home address, driver's license number, birthdate, eyesight restrictions, height, color of eyes). In one embodiment, such an identifier is a random number. In this manner, by utilizing a data element identifier which corresponds to a random number, security of privacy information is improved as one would only be able to obtain such sensitive information by obtaining such an identifier.

In step 502, computing device 101 stores the created identifiers in a file (referred to herein as the "identifier file") outside of the manifest file. In one embodiment, the identifier file is stored on the user's computing device 101. In another embodiment, the identifier file is stored on a smart card.

In step 503, computing device 101 creates a hash code or signature for each data element in the group of data elements. In one embodiment, a hash code is created by adding the unique identifier (e.g., random number) to the data element (e.g., age of 21) and hashing the combined data element and identifier using a cryptographic hash function to create a hash code. In one embodiment, a signature is created by applying a private key to the hash code. In one embodiment, such a private key is stored on the user's computing device 101. In another embodiment, the private key is stored on a smart card.

In step 504, computing device 101 inserts the documentation (e.g., label) of the data elements along with the associated hash codes or signatures in a manifest file.

In step 505, trusted authority 104 digitally signs the manifest file with a signature to create a trust group.

As discussed above, a "challenger," (e.g., government agency) may request from the user of computing device 101 one or more data elements (e.g., photo of the user, age of the user). The user of computing device 101 may send the requested data elements and the manifest file. The challenger will then attempt to verify the integrity of the received data elements (e.g., age of the user) as discussed below in connection with FIG. 6.

FIG. 6 is a flowchart of a method 600 for a challenger to verify the integrity of the requested data elements with the associated identifiers being located outside the manifest file in accordance with an embodiment of the present invention.

Referring to FIG. 6, in conjunction with FIGS. 1-2 and 5, in step 601, computing device 101 receives a request for one or more data elements in the group of data elements (e.g., driver's license contains a group of data elements, such as name, home address, driver's license number, birthdate, eyesight restrictions, height, color of eyes) from a verification device 103 (e.g., computing device of the challenger).

In step 602, computing device 101 transmits the requested data elements and the manifest file containing the hash codes or signatures associated with the requested data elements to verification device 103. Furthermore, along with transmitting the manifest file, computing device 101 transmits the identifiers associated with the requested elements of data from the identifier file to verification device 103. For example, verification device 103 may request to receive the data elements of the age of the user and a photo of the user. As a result, computing device 101 transmits the manifest file that only contains the documentation for those data elements as well as the associated hash codes or signatures to verification device 103. Computing device 101 also transmits the identifiers associated with the requested data elements (e.g., age of the user and a photo of the user) from the identifier file to verification device 103. In this manner, the user of computing device 101 is preserving the security of other privacy information (e.g., home address) by not providing such information to the verification device 103.

In step 603, verification device 103 validates that the manifest file is digitally signed by trusted authority 104 using the public key from trusted authority 104.

In step 604, verification device 103 computes a hash code by applying a hash function to the data element and the associated identifier.

In step 605, a determination is made by verification device 103 as to whether there is a signature in the manifest file for the requested data element.

If there is not a signature in the manifest file for the requested data element and there is only a hash code associated with the requested data element, then, in step 606, verification device 103 extracts the hash code for the requested data element from the manifest file.

If, however, there is a signature in the manifest file for the requested data element, then, in step 607, verification device 103 applies the public key of trusted authority 104 to the hash code (hash code computed in step 604) to compute a signature.

In step 608, verification device 103 extracts the signature for the requested data element from the manifest file.

In step 609, verification device 103 compares the computed hash code/signature with the extracted hash code/signature.

In step 610, a determination is made by verification device 103 as to whether the computed hash code/signature matches the extracted hash code/signature.

If the computed hash code/signature does not match the extracted hash code/signature, then, in step 611, the integrity of the requested data element is not verified by verification device 103.

If, however, the computed hash code/signature matches the extracted hash code/signature, then, in step 612, the integrity of the requested data element is verified by verification device 103.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for privacy control, the computer program product comprising a computer readable storage medium having program code embodied therewith, the program code comprising the programming instructions for:
    creating an identifier for a user to be added to each data element of a group of data elements;
    creating a signature for each data element of said group of data elements, wherein said signature is created by adding said identifier to said data element and hashing the combined data element and identifier using a cryptographic hash function to create a hash code, wherein said signature is created by applying a private key to said hash code; and
    inserting documentation of said data elements of said group of data elements along with associated identifiers and signatures in a manifest file.

2. The computer program product as recited in claim 1, wherein said manifest file is digitally signed with a signature from a trusted authority to create a trust group.

3. The computer program product as recited in claim 1, wherein the program code further comprises the programming instructions for:
    receiving a request for one or more data elements in said group of data elements from a verification device.

4. The computer program product as recited in claim 3, wherein the program code further comprises the programming instructions for:
    transmitting said requested one or more data elements along with said manifest file containing only identifiers and signatures associated with said requested one or more data elements to said verification device.

5. The computer program product as recited in claim 4, wherein said verification device validates said manifest file is digitally signed by a trusted authority using a public key from said trusted authority.

6. The computer program product as recited in claim 5, wherein said verification device extracts said identifier from said manifest file for a requested data element and performs a hash of said identifier with said requested data element using a hash function to compute a hash code.

7. The computer program product as recited in claim 6, wherein said verification device applies said public key of said trusted authority to said hash code to compute a signature.

8. The computer program product as recited in claim 7, wherein said verification device extracts a signature from said manifest file for said requested data element.

9. The computer program product as recited in claim 8, wherein said verification device compares said extracted signature with said computed signature to determine an integrity of said requested data element.

10. The computer program product as recited in claim 9, wherein said integrity of said requested data element is verified in response to said extracted signature matching said computed signature.

11. A system, comprising:
    a memory for storing a computer program for privacy control; and
    a processor connected to said memory, wherein said processor is configured to execute the program instructions of the computer program comprising:
        creating an identifier for a user to be added to each data element of a group of data elements;
        creating a signature for each data element of said group of data elements, wherein said signature is created by adding said identifier to said data element and hashing the combined data element and identifier using a cryptographic hash function to create a hash code, wherein said signature is created by applying a private key to said hash code; and
        inserting documentation of said data elements of said group of data elements along with associated identifiers and signatures in a manifest file.

12. The system as recited in claim 11, wherein said manifest file is digitally signed with a signature from a trusted authority to create a trust group.

13. The system as recited in claim 11, wherein the program instructions of the computer program further comprise:
    receiving a request for one or more data elements in said group of data elements from a verification device.

14. The system as recited in claim 13, wherein the program instructions of the computer program further comprise:
    transmitting said requested one or more data elements along with said manifest file containing only identifiers and signatures associated with said requested one or more data elements to said verification device.

15. The system as recited in claim 14, wherein said verification device validates said manifest file is digitally signed by a trusted authority using a public key from said trusted authority.

16. The system as recited in claim 15, wherein said verification device extracts said identifier from said manifest file for a requested data element and performs a hash of said identifier with said requested data element using a hash function to compute a hash code.

17. The system as recited in claim 16, wherein said verification device applies said public key of said trusted authority to said hash code to compute a signature.

18. The system as recited in claim 17, wherein said verification device extracts a signature from said manifest file for said requested data element.

19. The system as recited in claim 18, wherein said verification device compares said extracted signature with said computed signature to determine an integrity of said requested data element.

20. The system as recited in claim 19, wherein said integrity of said requested data element is verified in response to said extracted signature matching said computed signature.

* * * * *